United States Patent [19]
Allen et al.

[11] Patent Number: 4,541,739
[45] Date of Patent: Sep. 17, 1985

[54] CONTROLLED CAPILLARY BALL BEARING CAGE

[75] Inventors: Terry S. Allen; Dennis W. Smith; Peter E. Jacobson, all of Phoenix, Ariz.

[73] Assignee: Sperry Corporation, New York, N.Y.

[21] Appl. No.: 646,330

[22] Filed: Aug. 31, 1984

[51] Int. Cl.⁴ ............................................ F16C 33/38
[52] U.S. Cl. .................................. 384/470; 384/527
[58] Field of Search ............... 384/470, 527, 528, 534, 384/525, 523

[56] References Cited
U.S. PATENT DOCUMENTS

| | | | |
|---|---|---|---|
| 2,987,350 | 6/1961 | Hay | 384/470 |
| 3,472,567 | 10/1969 | Johnson | 384/527 |
| 3,744,862 | 7/1973 | Schwartz | 384/527 |
| 4,073,552 | 2/1978 | Christy | 384/470 |

Primary Examiner—Lenard A. Footland
Attorney, Agent, or Firm—Howard P. Terry; Martin G. Anderson

[57] ABSTRACT

A controlled capillary ball bearing cage composed of a plurality of layers woven mesh containing warp and woof strands. Selected removal of warp strands forms uniformly spaced cylindrical lubricant reservoirs around the circumference of ball bearing pockets machined into the cage.

1 Claim, 2 Drawing Figures

CONTROLLED CAPILLARY BALL BEARING CAGE

BACKGROUND OF THE INVENTION

1. Field of Invention

This invention relates to porous ball bearing cages and more particularly to providing an improved lubricant reservoir within a ball bearing cage.

2. Description of the Prior Art

In porous ball bearing cages it is desirable that after impregnating the cage with an initial supply of lubricant that the lubricant be made available in a uniformly controlled manner to provide the critical elastohydrodynamic film between the balls and the raceways over the lifetime of the bearing. Presently, the desirable characteristics are not available to the satisfactory degree in porous ball bearing cages made of existing materials.

In the past, many attempts have been made to fabricate cages of porous materials such as sintered porous metals, or sintered porous polyimides as disclosed in U.S. Pat. No. 3,027,626 issued to J. J. Murphy, for the purpose of providing a reservoir of lubricant within the cage. However, all of these attempts have had shortcomings such as limited lubricant reservoir capacity, loss of lubricant at high centrifugal cage speeds, uneven distribution of lubricant between the retainer raceway and the bearing member, leakage of lubricant along the retainer side walls. The foregoing shortcomings can be attributed to low porosity; nonuniform distribution of pores; variations in pore size; and the orientation of pores and openings. The low porosity; i.e., less than five percent of the volume, results in insufficient lubricant storage capacity with a subsequent reduction in bearing life span. The nonuniform distribution of pores effects the strength and speed sensitivity of the bearing along with nonuniform feeding of lubricant to the bearing raceways. Ther orientation of some of the pores has resulted in the oil bleeding out radially due to centrifugal force rather than tangentially toward the balls. Additionally, secondary machining operations on these materials after sintering, result in uncontrolled closure and/or enlargement of the pores at the desired contact surfaces between the balls and the raceways. The uncontrolled closure of the pores may prevent oil from moving from the reservoir in the cage to the ball contact surface thus rendering the stored lubricating oil unusable. Obversely, enlargement of the pores may at noncontacting surface areas cause unwanted seepage of lubricant from the reservoir resulting in a shortened reservoir life span.

SUMMARY OF THE INVENTION

The present invention overcomes the foregoing problems by providing for the formation of controlled size, orientation, and distribution of lubricant reservoirs within the ball cage blank. In one embodiment the cage blank is formed by incorporating a woven mesh having warp and woof strands within the cage material, machining the cage blank to a desired configuration, and subsequently selectively removing only the warp portion of the woven mesh thereby forming the desired lubricant reservoirs.

DESCRIPTION OF THE INVENTION

Figure 1:
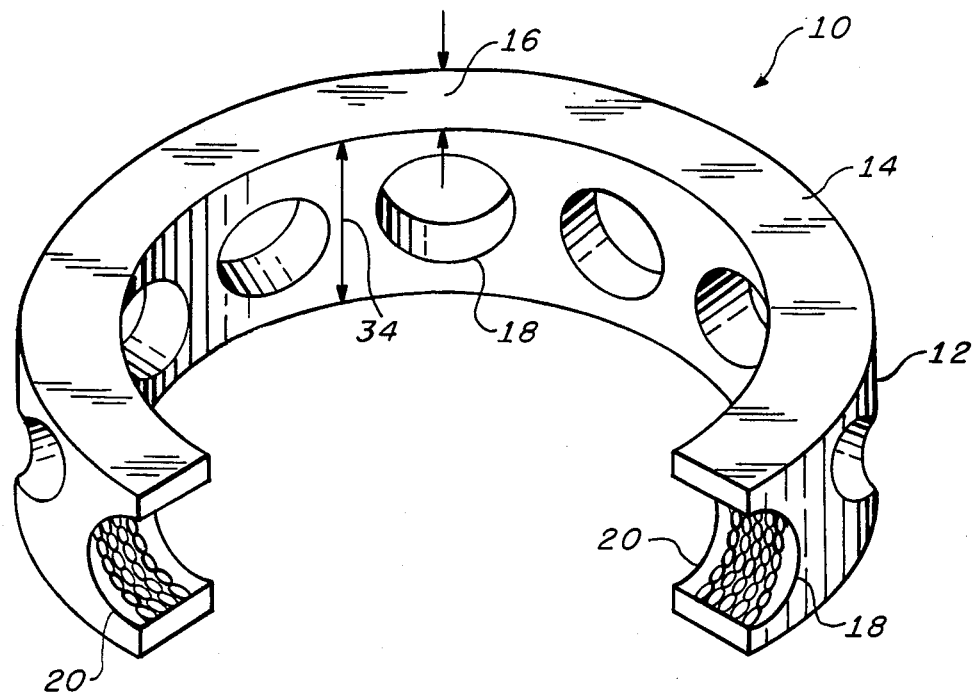
FIG. 1 is a partially cut-away perspective view of a controlled capillary ball bearing cage.

Referring to FIG. 1 the controlled capillary ball bearing cage 10 comprises a hollow cylindrical-shaped member 12 having a circumferential wall 14 of a predetermined radial thickness 16. A plurality of uniformly spaced ball pockets 18 extend radially through wall 14. Within wall 14 are formed a multiplicity of continuously formed, uniformly spaced, cylindrical-shaped lubricant reservoirs 20. Reservoirs 20 extend circumferentially within wall 14. Reservoirs 20 are in communication with ball pockets 18 and intersect ball pockets 18 in a direction generally tangentially to the radial axis of pockets 18.

Reservoirs 20 may comprise either lubricant absorbent material, such as for example, linen or, as hereinafter described, voids formed within the wall 14. In the preferred embodiment of the invention, reservoirs 20 are voids which are provided by etching away metal strands used in the fabrication of cage 10.

Figure 2:
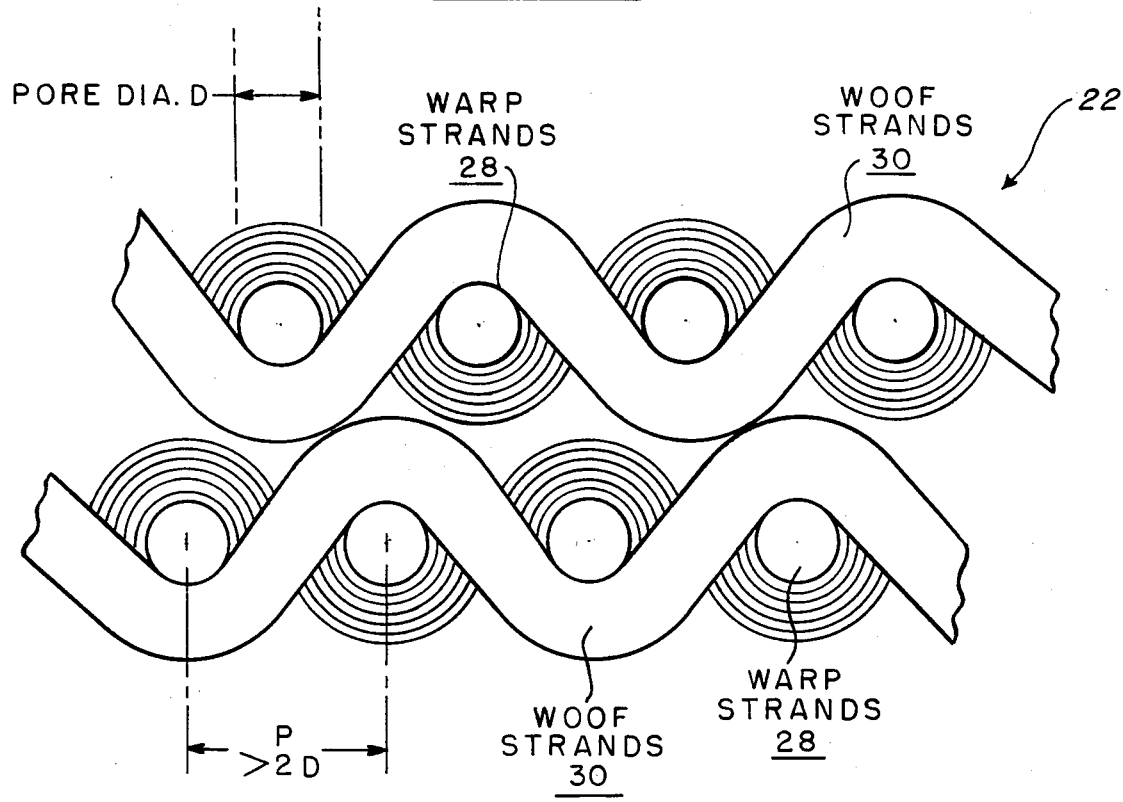
FIG. 2 is a cross-sectional diagram of the mesh material from which the cage is fabricated.

Referring now to FIG. 2, cage 10 is manufactured from a woven mesh 22 and a filler material wound on a cylindrical mandrel, not shown, in a conventional manner. The winding process forms a cylinderical-shaped hollow tube with circumferential wall 14 of a predetermined radial thickness 16. The tube is removed from the mandrel and cured, as well known in the art, to fuse the filler material to the woven mesh 22. The cured tube is cut into a plurality of sections of preselected axial widths to form individual cage blanks. The blanks are fabricated, by machining in a conventional manner, into ball bearing cage 10.

The woven mesh 22 is selected, by way of example, with the warp 28 formed of carbon steel wire strands and the woof 30 formed of organic fibers, such as linen. The warp 28 is eventually removed as by acid etching to form reservoirs 20. The desired diameter of the resulting reservoirs 20 is determined from knowledge of the anticipated application of the bearing, taking into account operational speed, temperature, cage size, and lubricant characteristics, such as, viscosity and capillary action. Typically, the diameter of pores in the reservoir 20 is equal to or slightly more than a thousandth of an inch and the diameter of the warp 28 is selected to equal the desired pore diameter in the reservoir 20. The diameter of the woof 30 fibers is preferably equal to the diameter of the warp 28. The pitch P of the woven mesh for both warp 28 and woof 30 is selected to be approximately 2 to 5 times the warp 28 diameter. The greater the pitch-to-warp diameter ratio, the lower the percentage of oil that is eventually stored in the reservoirs 20. Ratios of less than 2 are usually not practical because the space available for the filler material between the strands of the woven mesh 22 will be inadequate for proper bonding of the filler to the mesh 22.

The filler material is selected to impart rigidity to the woven mesh 22 and to impart structural integrity to the finished cage 10. The preferred filler material is an epoxy resin although other material such as phenolic may be chosen to suit a particular application.

The woven mesh 22 comprises a plurality of warp 28 and woof 30 strands arranged perpendicular to each. The woven mesh 22 may be selected with both the warp 28 and woof 30 of similar material such as linen and linen or steel and steel; or the warp 28 may be of steel and the woof 30 may be linen. Other materials and combinations may be selected to suit particular applications of the bearing.

In the construction of the tube from which cage 10 is made, the warp 28 is aligned in the circumferential direction. A variety of fabrication techniques can be used, the most common of which is to pass the woven mesh 22 through the epoxy or phenol resin and hence onto a heated rotating mandrel. The number of wraps of the epoxy coated woven mesh 22 on the mandrel is determined by the desired thickness of the circumferential wall 14. The diameter of the mandrel determines the inner diameter of the tube. FIG. 5 is an idealized partial cross-section of the tube 26 in a plane that contains the tube axis. In this Figure the filler material 24 is depicted as being transparent for purposes of simplification. As the Figure shows, the layers of the woven mesh 22 do not require alignment of the warp 28 strands, that is one warp 28 strand overlying another, to assure sufficient voids between the strands for proper bonding of the filler material to the woven mesh 22.

The tube is now ready for cage fabrication. A given cage design is machined from the tube using conventional techniques. The use of sharp cutting tools and optimum speeds and feeds is required so as to result in a suitable finished cage 10. Excessive speeds and/or feeds, inadequate support of the material and dull tools will result in cracking and chipping of the cage 10 as would be true of any other more conventional cage material. In general, the techniques which would be used for machining a solid back of the material used in the woven mesh 22 would be adequate. It should be noted that, unlike the machining of porous organic material, the machining process of the cage 10 ball pockets 18 in order to prevent pore sealing is not critical since the areas of the cage 10 which will subsequently become pores 20 are filled with solid material during the machining process.

After machining and deburring are complete, the cages 10 are etched by submersion in the proper acid which will selectively etch out the circumferential pore 20 strands. Low level agitation is effective during this etching process, to remove gas bubbles which form at the strand/acid interfaces, which results in quicker etching time. This etching process requires a few hours at the most. In some cage designs, the axial strands may also be removed during the etching process if desired by selective machining to expose the desired axial strands. When the axial strands are removed, the axial faces 14 of the cage are sealed with epoxy or other material. It should be noted here that the pore 20 strands exposed to the ball pockets 18 during the machining operation are the only members which are effected by the etching process. The remaining unetched strands serve to reinforce the cage as well as effect a thermal expansion coefficient for the composite which is lower than that of the epoxy or resin alone and which more nearly matches that of the bearing.

The etched cages 10 are now thoroughly cleaned by conventional techniques using soxhlet extraction and/or ultrasonic apparatus. This total cleaning process should be initiated by a chemical which is a neutralizer of the acid used for etching. After all cleaning operations are complete the cages should be vacuum baked in a manner similar to that used for conventional porous materials.

The final operation is to vacuum impregnate oil into cage 10 as is done with other types of porous cages. The amount of oil stored in the cage 10 may be determined by measuring the cage mass before and after impregnation.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. A controlled capillary ball bearing cage of a type having a hollow cylindrical shape with walls of predetermined length and radial thickness and a plurality of circular ball bearing pockets formed through said cylindar wall, said ball bearing cage comprising:
   a multiplicity of woven mesh layers having warp and woof strands of preselected material and diameters,
   said woven mesh layers being bonded with a selected filler material,
   circumference of said ball bearing pockets having a multiplicity of uniformly spaced, cylindrical shaped lubricant reservoirs formed therein.

* * * * *